United States Patent
Phillips (10) Patent No.: US 10,400,645 B2
(45) Date of Patent: Sep. 3, 2019

(54) SYSTEMS AND METHODS FOR VEHICLE SYSTEM COMPONENT THERMAL REGULATION

(71) Applicant: Ford Global Technologies, LLC, Dearborn, MI (US)

(72) Inventor: John Eric Byron Phillips, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 15/669,825

(22) Filed: Aug. 4, 2017

(65) Prior Publication Data
US 2019/0040779 A1    Feb. 7, 2019

(51) Int. Cl.
| F01N 3/20 | (2006.01) |
| B60T 1/00 | (2006.01) |
| F01N 9/00 | (2006.01) |
| B60T 5/00 | (2006.01) |

(52) U.S. Cl.
CPC ............ *F01N 3/2013* (2013.01); *B60T 1/00* (2013.01); *B60T 5/00* (2013.01); *F01N 3/2086* (2013.01); *F01N 9/00* (2013.01); *F01N 2240/05* (2013.01); *F01N 2430/08* (2013.01)

(58) Field of Classification Search
CPC ............ B01D 46/2418; B01D 46/4263; B01D 2255/905; B01J 35/04; F01N 3/2013; F01N 3/2026; F01N 3/26; F01N 3/2828; F01N 2240/05; F01N 2510/00; H05B 6/108
See application file for complete search history.

(56) References Cited

U.S. PATENT DOCUMENTS

| 3,581,489 | A | * | 6/1971 | Camin | ................... B01J 8/067 60/275 |
| 4,107,935 | A | | 8/1978 | Steyert, Jr. | |
| 8,104,293 | B2 | | 1/2012 | Barve et al. | |
| 9,383,124 | B2 | | 7/2016 | Bonnay et al. | |
| 2009/0120067 | A1 | * | 5/2009 | Elwart | ..................... F01N 5/02 60/285 |
| 2015/0075138 | A1 | * | 3/2015 | Crawford | ............. F01N 3/2026 60/274 |

FOREIGN PATENT DOCUMENTS

| JP | 08028250 | A | * | 1/1996 |
| JP | 11336534 | A | * | 12/1999 |
| JP | 2010013945 | A | * | 1/2010 |
| JP | 2010024910 | A | * | 2/2010 |
| WO | 2007101433 | A1 | | 9/2007 |

* cited by examiner

*Primary Examiner* — Patrick D Maines
(74) *Attorney, Agent, or Firm* — Julia Voutyras; McCoy Russell LLP (57) ABSTRACT

Methods and systems are provided for expediting catalyst heating and cooling a braking system of a vehicle via applying a magnetic field to a vehicle system component. In one example, a method may include, responsive to a temperature of the catalyst being less than a threshold temperature, applying a magnetic field to an exhaust system component arranged proximate to the catalyst, and removing the magnetic field from the exhaust system component responsive to the temperature reaching the threshold temperature. In another example, the method further includes, following a vehicle braking event, applying the magnetic field to a braking system component, and removing the magnetic field from the braking system component responsive to magnetic field deactivating conditions being met.

19 Claims, 4 Drawing Sheets

SYSTEMS AND METHODS FOR VEHICLE SYSTEM COMPONENT THERMAL REGULATION

FIELD

The present description relates generally to methods and systems for temperature regulation of components of a vehicle system.

BACKGROUND/SUMMARY

A motor vehicle commonly includes a catalyst (also referred to herein as a catalytic converter) as an engine exhaust after-treatment device. However, at engine start, particularly during cold ambient conditions, the catalyst has not yet reached its optimal operating temperature (e.g., light-off temperature). Exhaust released before the catalyst has reached its light-off temperature may contribute a large percentage of the total vehicle emissions. Accordingly, engine control systems may use various approaches to expedite catalyst heating to reduce an amount of time after engine start before the catalyst light-off temperature is reached, thereby reducing vehicle emissions. Typically, the various approaches aim to increase an amount of thermal energy that reaches the catalyst, such as by increasing exhaust temperature via retarded spark timing.

However, the inventor herein has recognized an additional approach to further reduce the amount of time after engine start before the catalyst light-off temperature is reached. Namely, the inventor herein has recognized that the magnetocaloric effect (MCE) may be used to decrease an amount of thermal energy needed to achieve the catalyst light-off temperature, which may be used alone or in combination with other approaches for expediting catalyst heating, by decreasing a specific heat capacity of the catalyst. As one example, retarded spark timing may reduce fuel economy, decrease combustion stability, and increase engine vibrations, and thus, decreasing spark retard usage may increase fuel economy and reduce an occurrence of misfire.

Further still, the MCE may be used to thermally regulate other vehicle system components, such as braking system components (e.g., brake rotors). Typically, to increase brake cooling, the size of the brake rotors is increased. Increasing the size of the brake rotors increases the heat capacity and surface area of the rotors, which enables the braking system to absorb more thermal energy before the temperature increases and dissipate that thermal energy faster. However, increasing the size of the brake rotors also adds unsprung, rotating mass to the vehicle. The inventors herein have recognized that by using the MCE to decrease the specific heat capacity of the brake rotors, the rate at which the braking system dissipates heats to the surroundings may be increased without increasing the size of the brake rotors.

In one example, the issues described above may be addressed by a method for an engine, comprising: responsive to a temperature of an exhaust catalytic converter being below a first threshold temperature, applying a magnetic field to an exhaust system component arranged proximate to the exhaust catalytic converter; and, responsive to the temperature increasing to or above the first threshold temperature, stopping applying the magnetic field. In this way, the amount of time before the exhaust catalytic converter reaches its light-off temperature may be reduced.

As one example, such as when the temperature of the exhaust catalytic converter is less than a second, lower threshold temperature, an alternate engine parameter may be adjusted in addition to applying the magnetic field to the exhaust system component, such as retarding spark timing. In this way, the temperature of the exhaust catalytic converter may be raised faster than when spark retard or the magnetic field are used alone, further reducing the amount of time before the exhaust catalytic converter reaches its light-off temperature and, as a result, reducing vehicle emissions. As another example, the method may further include applying the magnetic field to a braking system component of a vehicle in which the engine is installed for a duration following a vehicle braking event; and stopping applying the magnetic field to the braking system component in response to one or more of a temperature of the braking system component reaching a threshold temperature and commencement of a subsequent braking event. By applying the magnetic field to the braking system component following braking, heat may be dissipated from the braking system while keeping the braking system smaller, preventing braking system degradation due to overheating while reducing the overall mass of the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
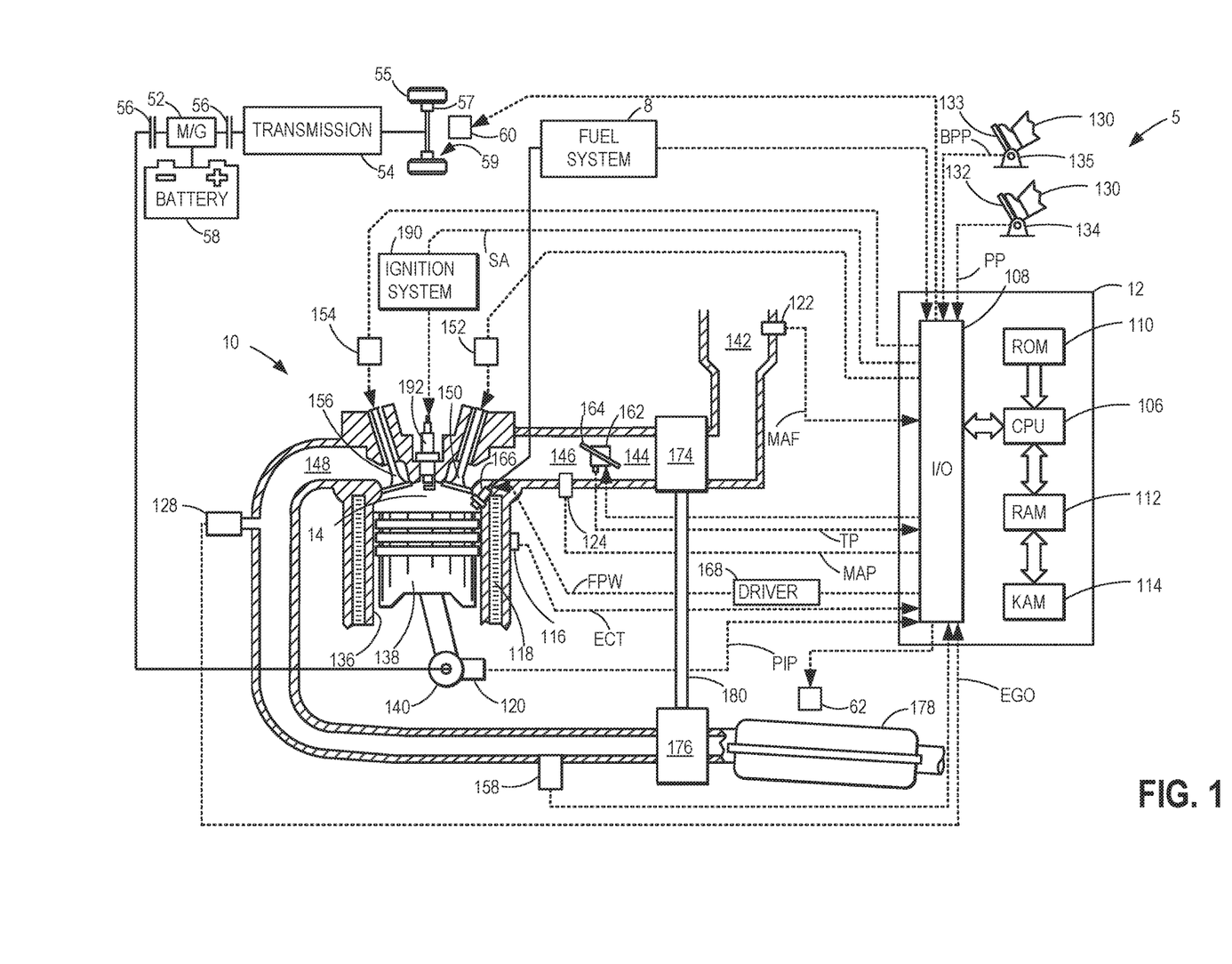
FIG. 1 shows a schematic depiction of an example vehicle system.

The following description relates to systems and methods for applying a magnetic field to select vehicle system components, such as those depicted in the example vehicle system of FIG. 1, to thermally regulate the vehicle system components using the magnetocaloric effect (MCE). For example, the magnetic field may be applied to braking system components after a braking event to increase a rate of heat dissipation, such as according to the example method of FIG. 2, or to exhaust system components to increase the rate of catalyst heating, such as according to the example methods of FIGS. 2 and 3. A prophetic example timeline of applying the magnetic field to the exhaust system components for catalyst heating and to the braking system components for braking system cooling is shown in FIG. 4.

The MCE is a phenomenon in which a temperature change of a magnetocaloric material is caused by exposing the magnetocaloric material to a changing applied magnetic field (e.g., the magnetic field is increased and then decreased). When the magnetic field is first applied, magnetic domains of the magnetocaloric material align in the direction of the applied magnetic field. This reduces the magnetic degrees of freedom of the magnetocaloric material (e.g., decreases its magnetic entropy), thereby reducing its specific heat capacity and causing the temperature of the magnetocaloric material to (at least temporarily) rise. A specific heat capacity of a material is the ratio of heat absorbed by (or removed from) the material to a resulting temperature change (per unit mass). Therefore, by reducing the specific heat capacity of the magnetocaloric material via the applied magnetic field, a smaller amount of heat transfer into or out of the magnetocaloric material will result in a greater temperature change. If the temperature of the magnetocaloric material is greater than its surroundings, it may transfer heat to its surroundings, resulting in a decrease in temperature. If the temperature of the magnetocaloric material is less than its surroundings, it may absorb heat from its surroundings, resulting in a temperature increase. Thus, the MCE may be used for both heating and cooling depending on the direction of heat transfer (e.g., into the magnetocaloric material or out of the magnetocaloric material). When the applied magnetic field is decreased or removed, the magnetic domains are able to become disoriented by the thermal energy present in the magnetocaloric material, transferring thermal energy (and entropy) to magnetic entropy.

Turning now to the figures, FIG. 1 depicts an example embodiment of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Vehicle wheels 55 may include a braking system 59, including brakes 57, to slow the rotation of vehicle wheels 55. Brakes 57 may be friction brakes, such as disc brakes or drum brakes, or electromagnetic (e.g., electromagnetically-actuated) brakes, for example. Both friction brakes and electromagnetic brakes use friction between components of the braking system to slow the rotation of vehicle wheels 55, and thus the linear motion of vehicle 5. One or more components of braking system 59, such as brake pads, brake rotors, etc., may be at least partially comprised of a magnetocaloric material, such as one or more paramagnetic materials (e.g., iron, gadolinium, and their alloys). Further, braking system 59 may include a temperature sensor for measuring a temperature of the braking system, which may be coupled to brakes 57. Braking system 59 may also include a braking unit that adjusts an amount of braking effort in response to an operator-requested braking event or a controller-initiated braking event. For example, during the operator-requested braking event, the vehicle operator 130 may depress a brake pedal 133. A brake pedal position sensor 135 may generate a proportional brake pedal position signal BPP, which may be used to determine the amount of braking effort requested by the vehicle operator. As the depression of brake pedal 133 increases, the amount of braking effort increases, for example. The amount of braking effort may include brake force and/or brake torque.

A magnetic field generator 60 may be included in vehicle 5 for generating and applying a magnetic field to braking system 59, as described further below with reference to FIG. 2. In one example, magnetic field generator 60 includes a permanent magnet and an electronic actuator for moving the permanent magnet closer to and farther away from braking system 59 in order to apply and withdraw the magnetic field applied to braking system 59, respectively. In another example, magnetic field generator 60 may be an electromagnet positioned so that when electric current is supplied to magnetic field generator 60, the magnetic field produced by magnetic field generator 60 is applied to braking system 59. A strength of the magnetic field generated by magnetic field generator 60 may vary based on the properties of the magnetocaloric material(s) of the one or more components of braking system 59 as well as an achievable proximity of magnetic field generator 60 to the one or more components of braking system 59 at least partially composed of the magnetocaloric material. Further, the strength of the magnetic field generated by magnetic field generator 60 may be limited based on potential electromagnetic interference. Further still, sensor signals, such as signals or outputs of oxygen sensors, may be compensated for such electromagnetic interference while the magnetic field is generated by magnetic field generator 60 and any other magnetic field generators included in vehicle 5, as described further below.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. As mentioned above, exhaust gas sensor 128 and the rest of the sensors included in vehicle 5 may be affected by electromagnetic interference due to magnetic field(s) produced by magnetic field generator(s) of the vehicle system. As such, the output of exhaust gas sensor 128 may be compensated when a magnetic field is applied. For example, a switching point of the sensor (e.g., a voltage at which the sensor switches from indicating rich fuel conditions to lean fuel conditions) may be shifted. In one example, the switching point may be shifted to a higher voltage when a magnetic field is applied. In an alternative example, the switching point may be shifted to a lower voltage when a magnetic field is applied. In still another example, sensors, including exhaust gas sensor 128, may be at least partially shielded from the electromagnetic interference, such as by shielding components (e.g., wires) of the sensors within close proximity to the magnetic field generator(s).

Emission control device 178 may be a three-way catalyst, a NOx trap, various other emission control devices, or combinations thereof. In the example of FIG. 1, emission control device 178 is a three-way catalyst, including a catalyst housing, which may also be referred to herein as an exhaust catalytic converter or simply a catalyst. In one example, the catalyst housing, which is arranged proximate to catalyst, is comprised at least partially of a magnetocaloric material, such as one or more paramagnetic materials (e.g., iron, gadolinium, and their alloys). In some examples, exhaust passage 148 is additionally or alternatively comprised of a magnetocaloric material, which may be the same or a different magnetocaloric material as the catalyst housing. For example, a portion of the exhaust passage 148 proximate to (e.g., directly upstream and/or downstream and/or surrounding) the catalyst may be comprised of the magnetocaloric material.

Figure 2:
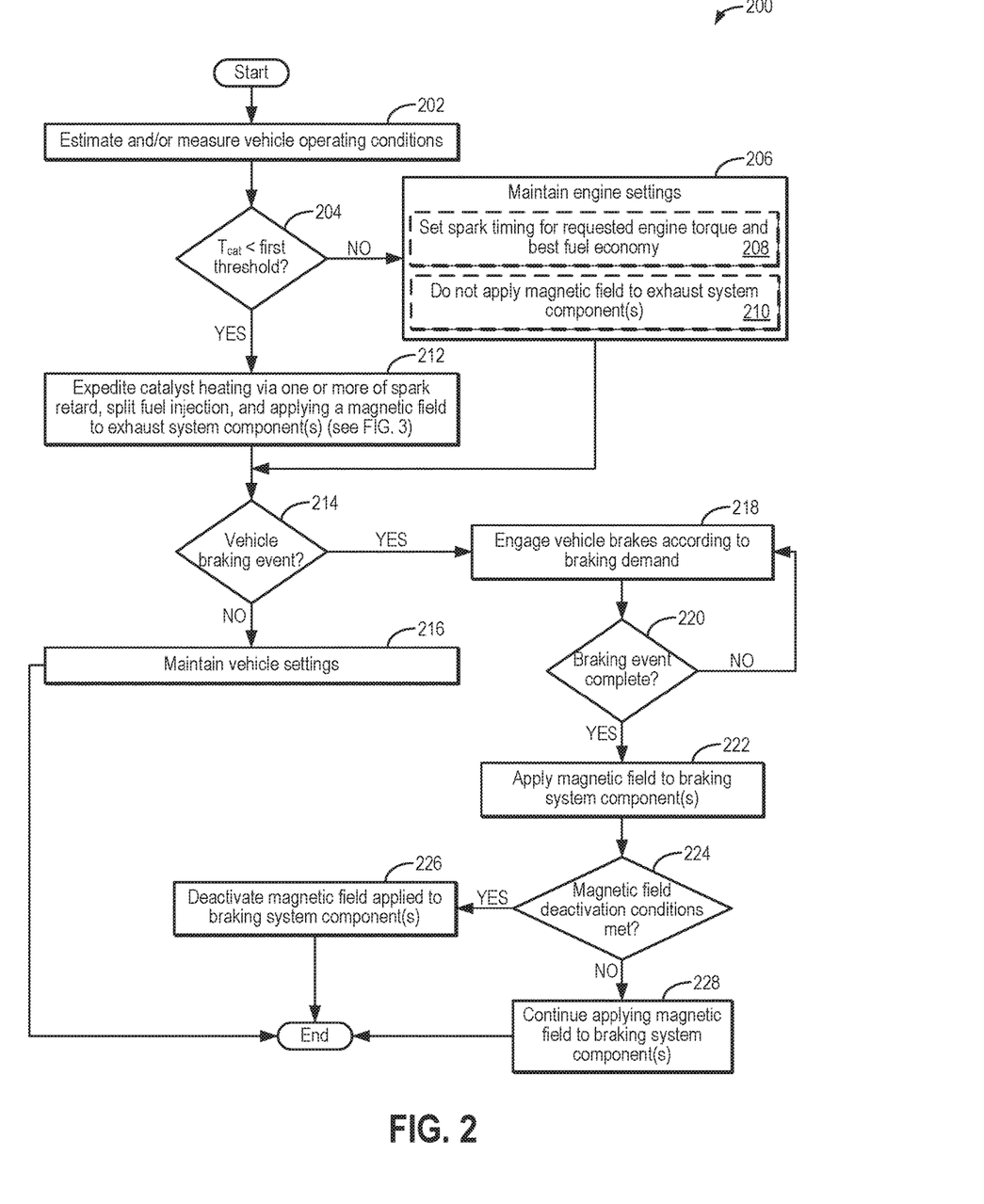
FIG. 2 is a high-level flow chart of an example method for thermally regulating vehicle system components.
Figure 3:
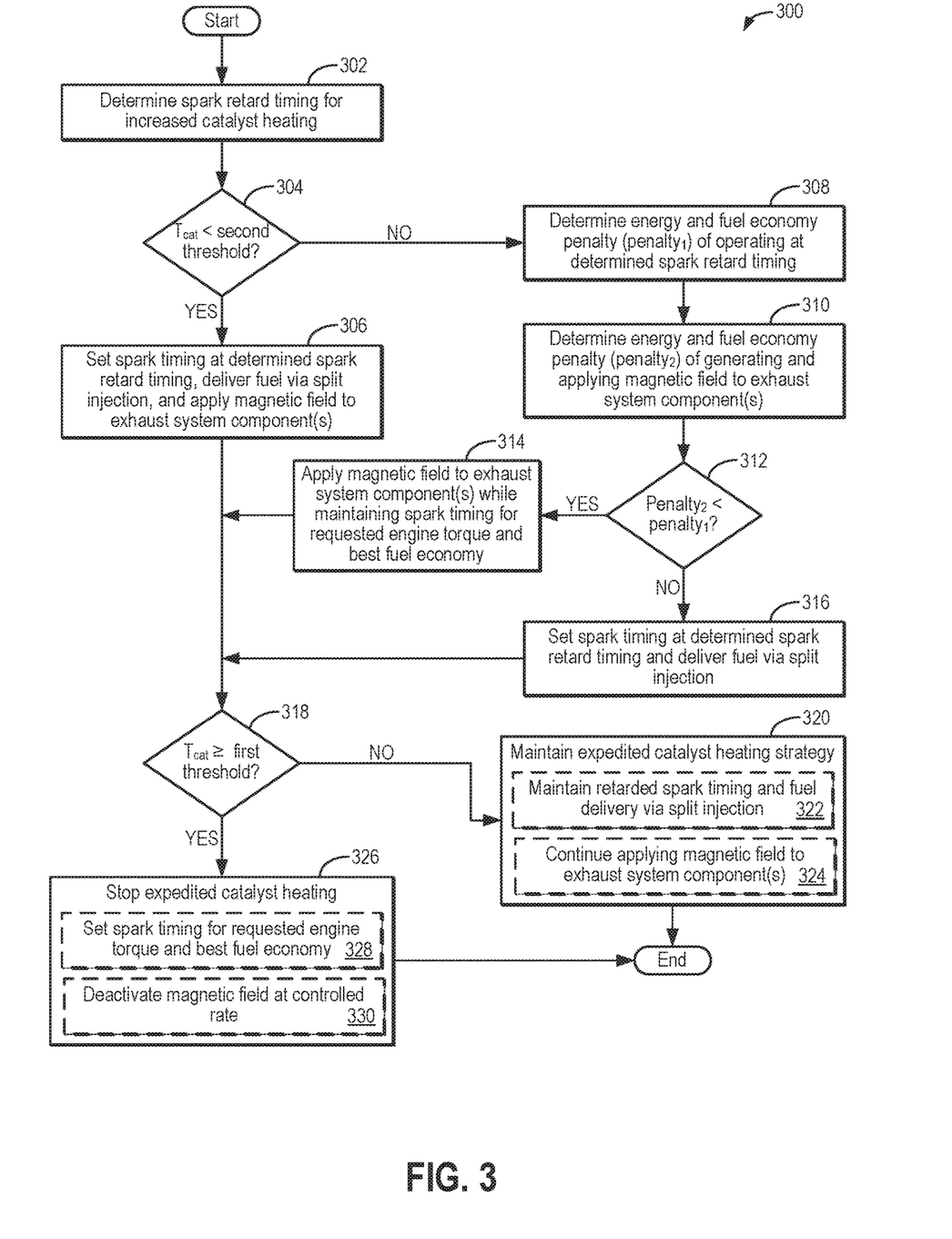
FIG. 3 is a flow chart of an example method for expediting catalyst heating via one or more of spark retard and applying a magnetic field.
Figure 4:
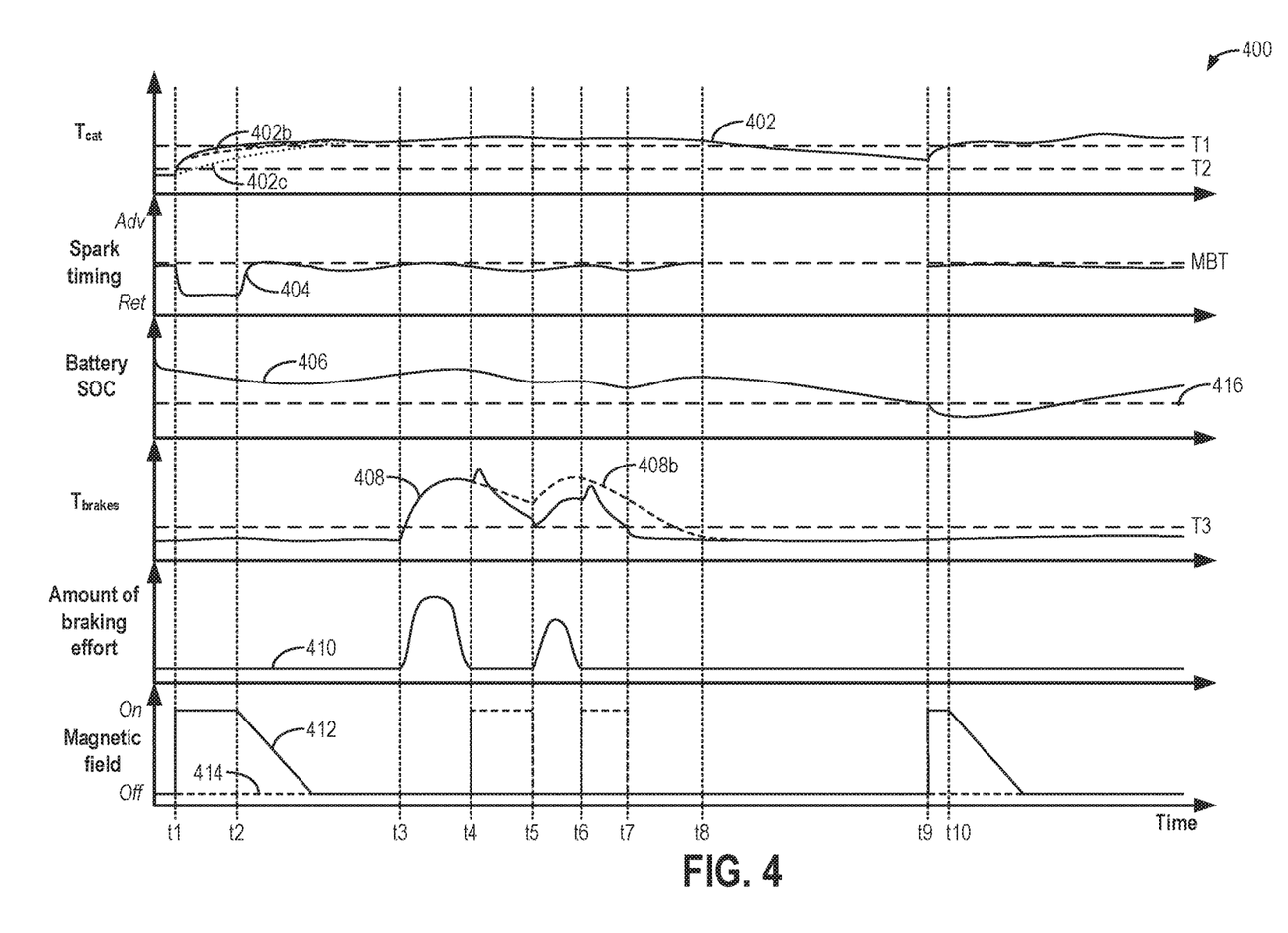
FIG. 4 shows an example graph of applying a magnetic field to thermally regulate vehicle system components during vehicle operation.

A magnetic field generator 62 may be included near the area of catalyst 178 and exhaust passage 148 for applying a magnetic field to catalyst 178 and/or exhaust passage 148, as described further with respect to FIGS. 2-3. As described above for magnetic field generator 60, magnetic field generator 62 may be a permanent magnet or an electromagnet, and may be the same or a different type of magnetic field generator as magnetic field generator 60. In an alternative example, magnetic field generator 62 may be omitted, and magnetic field generator 60 may apply the magnetic field to both braking system 59 and exhaust system components (e.g., catalyst 178 and/or exhaust passage 148). For example, magnetic field generator 60 may be actuated to a position proximate to braking system 59 to apply the magnetic field to braking system 59 and may be actuated to a different position proximate to the exhaust system components to apply the magnetic field to catalyst 178 and/or exhaust passage 148.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT to expedite catalyst warm-up during engine start. The retarded spark timing serves to transfer more heat to the exhaust than occurs at MBT timing, which may then be transferred to the catalyst as the exhaust is treated.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in intake passage 146 rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may actuate magnetic field generator 60 in order to cool braking system 59 via the MCE, as further described below with respect to FIG. 2. In another example, the controller may retard a timing of signal SA sent to ignition system 190, thereby retarding a timing of the spark provided to cylinder 14 by spark plug 192, and/or actuate magnetic field generator 62 in order to expedite catalyst warm-up when the temperature of catalyst 178 is less than its light-off temperature, as further described below with respect to FIGS. 2-3.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During vehicle operation, a temperature of a braking system (e.g., braking system 59 of FIG. 1) increases as brakes (e.g., brakes 57 of FIG. 1) are applied to slow the rotation of vehicle wheels. If the braking system becomes overheated, braking performance is degraded. Therefore, braking system cooling enables safe and effective braking. Further, as described above, vehicle emissions may be increased prior to an exhaust catalytic converter (e.g., catalyst 178 of FIG. 1) reaching its light-off temperature. Therefore, catalyst heating may be expedited in order to reduce the time it takes for the catalyst to reach its light-off temperature, thereby reducing the overall emissions produced by the vehicle. In particular, if one or more components of the braking system (for example, brake rotors and/or brake pads) and one or more of the exhaust system (for example, a housing of the catalyst and/or an exhaust passage) are at least partially comprised of a magnetocaloric material, application of a magnetic field to these select components may be used in a process to ultimately cool the braking system and/or heat the exhaust catalytic converter.

FIG. 2 provides an example method 200 for thermally regulating the braking system and the catalyst via applying a magnetic field to select components of the braking system or catalyst. Instructions for carrying out method 200 and the rest of the methods included herein may be executed by a controller (e.g., controller 12 of FIG. 1) based on instructions stored on a memory of the controller and in conjunction with signals received from sensors of the vehicle system, such as the sensors described above with reference to FIG. 1 (e.g., exhaust temperature sensor 158, a temperature sensor of braking system 59). The controller may employ engine and vehicle actuators of the vehicle system (e.g., magnetic field generators 60 and 62 of FIG. 1) to adjust engine and vehicle operation according to the methods described below.

Method 200 begins at 202 and includes estimating and/or measuring vehicle operating conditions. Vehicle operating conditions may include a mode of vehicle operation (such as an electric mode, in which the vehicle is propelled with torque from an electric motor, or an engine mode, in which the vehicle is propelled at least partially with torque from an engine), driver-demanded torque, engine speed and load, a temperature of the catalyst, a state of charge (SOC) of a system battery (e.g., traction battery 58 of FIG. 1), a temperature of the braking system (e.g., as measured by a temperature sensor included in the braking system), and a position of a brake pedal (e.g., from signal BPP output by a brake pedal position sensor, such a brake pedal position sensor 135 shown in FIG. 1). The temperature of the catalyst may be inferred based on exhaust temperature, with the controller inputting the exhaust temperature into a look-up table or mathematic function and outputting the temperature of the catalyst, for example. Additionally or alternatively, if a temperature sensor is not included in the braking system, for example, braking event durations (e.g., a duration over which the brake pedal is depressed for each braking event) may be monitored and stored in a memory of the controller, and then the stored values may be used to determine a standard magnetic field application duration.

At 204, it is determined if the temperature of the catalyst ($T_{cat}$) is less than a first threshold temperature. The first threshold temperature may be the light-off temperature of the catalyst, in one example. As described above, operating with the catalyst below the light-off temperature may increase vehicle emissions, such as may occur during an engine cold start.

If the temperature of the catalyst is not less than the first threshold temperature (or if the vehicle is operated in the electric mode, in which the catalyst is not used), method 200 proceeds to 206 and includes maintaining engine settings. Maintaining engine settings may include setting spark timing for the requested (e.g., driver-demanded) torque and best fuel economy, as indicated at 208. For example, spark may be provided at or near MBT in order to maximize engine power for the given engine load. Maintaining engine settings may also include not applying a magnetic field to one or more exhaust system components, as indicated at 210. For example, the controller may not actuate a magnetic field generator (such as magnetic field generator 62 shown in FIG. 1) to apply a magnetic field to one or more exhaust system components. By not applying the magnetic field to the one or more exhaust system components, the specific heat capacity of the catalyst is not altered. With the temperature of the catalyst not below the first threshold temperature, an engine cold start condition is not present, and thus, engine control approaches to expedite catalyst heating, such as retarded spark timing and applying the MCE, may instead degrade fuel economy and engine performance, for example.

If instead the temperature of the catalyst is less than the first threshold temperature at 204, method 200 proceeds to 212 and includes expediting catalyst heating via one or more of spark retard, split fuel injection, and applying a magnetic field to one or more exhaust system components, as will be further described herein with respect to FIG. 3. In this way, the amount of time for the catalyst to reach its light off temperature may be reduced, thereby reducing overall vehicle emissions.

Regardless of whether the catalyst has reached its light-off temperature, at 214, it is determined if a vehicle braking event is present (e.g., occurring). For example, a vehicle braking event may include a vehicle operator depressing the brake pedal (e.g., brake pedal 133 of FIG. 1) to request braking of the vehicle. In one example, depressing the brake pedal generates a signal BPP that is sent to the controller to actuate the braking system. In another example, depressing the brake pedal directly actuates engagement of the brakes. In still another example, the controller may actuate the braking system in a fully autonomous or semi-autonomous vehicle responsive to recognition of an object in a travel path of the vehicle (such as using data from one or more sensors, radar systems, and/or an on-board camera), without input from a vehicle operator.

If a vehicle braking event is not present, method 200 proceeds to 216 and includes maintaining vehicle settings. As such, the vehicle brakes will not be engaged. Further, a magnetic field will not be applied to one or more braking system components. For example, the controller may not actuate a magnetic field generator (such as magnetic field generator 60 shown in FIG. 1) to apply a magnetic field to one or more braking system components. Thus, application of the magnetic field will not be used for braking system cooling. Following 216, method 200 ends.

If instead a vehicle braking event is present at 214, method 200 proceeds to 218 and includes engaging vehicle brakes according to braking demand. In one example, in response to the controller receiving the signal BPP generated from the depression of the brake pedal or from the one or more sensors, radar systems, and/or on-board camera, the controller determines an amount of brake effort and then sends a signal to an actuator of the brakes to adjust the braking effort. In another example, the brakes are directly actuated by the brake pedal, with the braking effort proportional to the brake pedal position. As an example, if the brakes are friction brakes, hydraulic brake fluid may in turn press a brake pad into a brake rotor in proportion to the brake pedal position signal, generating friction (and heat) between the brake pad and the brake rotor and slowing the vehicle wheels. The further the brake pedal is depressed, the greater the engagement between the brake pad and the brake rotor. Thus, during braking, the temperature of the braking system may increase.

At 220, it is determined if the braking event is complete. The braking event may be complete when the vehicle operator no longer depresses the brake pedal and/or the controller no longer actuates the braking system to engage the brakes, for example. If the braking event is not complete (e.g., the brakes remain engaged), the method may return to 218 and continue engaging vehicle brakes according to braking demand, as described above.

If the braking event is complete (e.g., the brakes are no longer engaged), method 200 proceeds to 222 and includes applying a magnetic field to one or more braking system components at least partially composed of a magnetocaloric material (e.g., the brake pad and/or the brake rotor). The magnetic field may be applied via a magnetic field generator positioned such that the magnetic field generated by the magnetic field generator reaches the one or more braking system components. For example, if the magnetic field generator is a permanent magnet, applying the magnetic field to the one or more braking system components (e.g., the brake pad and/or the brake rotor) may include the controller actuating an actuator to move the permanent magnet into a position in which the magnetic field generated by the permanent magnet is applied to the one or more braking system components, such as when the permanent magnet is in within a threshold distance (e.g., in a range of 0-24 inches) from the braking system components. The threshold distance may be a pre-calibrated value based on a strength of the magnetic field of the permanent magnet, with the threshold distance decreasing as the strength of the magnetic field decreases. In another example, if the magnetic field generator is an electromagnet, applying the magnetic field to the one or more braking system components may include the controller flowing electric current through the electromagnet, which may be positioned proximate to (e.g., within a threshold distance from or closer to the braking system component comprising the magnetocaloric material than an exhaust system component comprising the magnetocaloric material) the braking system component(s). In some embodiments, there may be one magnetic field generator for each brake (e.g., for each wheel of the vehicle) or multiple magnetic field generators for each brake. For example, the magnetic field generator(s) may be positioned in a center of or around hubs of the vehicle wheels. In another example, the magnetic field generator(s) may be positioned behind the brake rotors. In still other examples, the magnetic field generator(s) could be mounted on a bracket, such as a movable (e.g., rotatable, slidable) bracket if a permanent magnet is used, positioned off a chassis of the vehicle or off the braking system.

When the magnetic field is applied to the braking system component(s), the magnetic domains of the braking system component(s) that are comprised at least partially of the magnetocaloric material will align with the applied magnetic field, reducing the specific heat capacity of the magnetocaloric material (and thus the braking system overall). Initially, this will cause the temperature of the magnetocaloric material to further increase. However, the magnetocaloric material will shed heat to its (cooler) surroundings via both convective heat transfer and radiative heat transfer more quickly than when the magnetic field is not applied, increasing the overall rate of cooling of the braking system. For example, a rate of convective heat transfer is directly proportional to a temperature difference between an object (e.g., the braking system) and its surrounding fluid (e.g., ambient air). Since applying the magnetic field initially increases the temperature of the magnetocaloric material of the braking system component(s), the rate of convective heat transfer increases. Similarly, a rate of radiative heat transfer is directly proportional to an absolute temperature of the object. Therefore, the increase in temperature also increases the rate of radiative heat transfer. Additionally, with the decreased specific heat capacity, it takes less heat to be shed from the magnetocaloric material of the braking system for the temperature to decrease compared to when the specific heat capacity is greater, such as when the magnetic field is not applied.

Additionally, when the magnetic field is applied, electromagnetic interference may affect sensor readings, such as output of an exhaust gas sensor (e.g., exhaust gas sensor 128 of FIG. 1). Thus, sensor readings may be compensated (e.g., corrected) while the magnetic field is applied, such as by shifting the switching point of the exhaust gas sensor, as further described above with reference to FIG. 1.

At 224, it is determined if magnetic field deactivation conditions are met. Magnetic field deactivation conditions may include the braking system temperature being less than a threshold temperature, a threshold duration being met, the battery SOC being less than a threshold SOC, and the brakes being applied (e.g., as described at 214). Magnetic field deactivation conditions may be considered to be met if one or more of the magnetic field deactivation conditions are present. The threshold temperature may define a temperature at which the braking system is considered to be sufficiently cooled. The threshold temperature may be a non-zero threshold but may be lower than the temperature of the braking system components directly following a braking event. For example, once the threshold temperature is reached, the braking system may be expected to function nominally or efficiently during a subsequent braking event. Similarly, the threshold duration may define a duration after which the braking system is predicted to be sufficiently cooled (e.g., cooled to the threshold temperature), which may be the standard magnetic field application duration (e.g., as determined at 202 based on stored braking event durations). Since the strength of the applied magnetic field affects the temperature change of the magnetocaloric material (e.g., as the strength of the magnetic field increases, the magnetocaloric material undergoes a larger change in temperature), the threshold duration may be determined by the controller based on the strength of the applied magnetic field. For example, the controller may reference a look-up table with the strength of the magnetic field, a starting temperature of the braking system, and the ambient temperature as the inputs and output the threshold duration.

Thus, the threshold duration may vary based on operating conditions. In one example, as the strength of the applied magnetic field increases, the threshold duration may decrease. Since applying the magnetic field may use energy from a battery of the vehicle, such as by supplying current to an electromagnet or moving a permanent magnet with an electronic actuator, the threshold SOC may be a battery state of charge level below which the battery may not be able to support or execute additional vehicle functions (such as operating the vehicle in an electric mode). In this way, the applied magnetic field may be deactivated before the battery SOC falls below the threshold SOC, thereby preserving an amount of battery life for powering additional vehicle functions or systems. Additionally, applying the magnetic field during braking may cause the braking system to heat up faster.

If the magnetic field deactivation conditions are met, method 200 proceeds to 226 and includes deactivating the magnetic field applied to the braking system components. For example, if the magnetic field generator is a permanent magnet, deactivating the magnetic field applied to the braking system components may include actuating an actuator that adjusts the position of the permanent magnet such that the permanent magnet is moved to a distance at which the magnetic field generated by the permanent magnet no longer reaches the magnetocaloric material of the one or more braking system components. In another example, if the magnetic field generator is an electromagnet, deactivating the magnetic field applied to the braking system components may include no longer flowing electric current through the electromagnet. When the magnetic field is no longer applied to the braking system components, the magnetic domains of the magnetocaloric material become disoriented by the thermal energy in the material, absorbing the energy and further decreasing the temperature of the material (and the braking system overall). Thus, by applying the magnetic field to the braking system component(s), heat is dissipated more quickly and the braking system is able to reach a cooler temperature than when the magnetic field is not applied to the braking system component(s). Following 226, method 200 ends.

If the magnetic field deactivation conditions are not met at 224, (e.g., the braking system temperature is not less than the threshold temperature, the threshold duration has not been met, the battery SOC is not less than the threshold SOC, and the brakes are not applied), method 200 proceeds to 228 and includes continuing to apply the magnetic field to the one or more braking system components. Thus, the braking system continues to be more rapidly cooled than when the magnetic field is not applied to the one or more braking system components. Following 228, method 200 ends.

As such, FIG. 2 provides a method for thermally regulating an exhaust catalyst and a braking system of a vehicle using application of a magnetic field to one or more exhaust system and braking system components that are at least partially comprised of a magnetocaloric material. Application of the magnetic field affects the rate of heat transfer to or from a component comprised at least partially of the magnetocaloric material. The direction of heat transfer depends on the temperature of the component relative to its surroundings. Since the ambient air is colder than the braking system, the application of the magnetic field causes heat to be more quickly transferred out of the braking system than when the magnetic field is not applied. Continuing to FIG. 3, applying a magnetic field for catalyst heating will be explained, which may be used alone or in combination with additional expedited catalyst heating strategies, in the example of method 300. FIG. 3 may be performed by the controller as a part of method 200 in FIG. 2 (e.g., at 212).

Method 300 begins at 302 and includes determining a spark retard timing for increased catalyst heating. Retarding spark timing (e.g., the timing during an engine cycle at which an ignition spark is provided by a spark plug, such as spark plug 192 of FIG. 1) may increase the exhaust temperature due to combustion occurring later in the engine cycle. The increased exhaust temperature may provide additional heat transfer to the catalyst, thereby expediting catalyst heating. Therefore, the spark retard timing may be determined as a set number of crank angle degrees retarded from MBT, with MBT determined based on engine operating conditions (e.g., as measured at 202 of FIG. 2), as described further herein with reference to FIG. 1.

At 304, it is determined if the temperature of the catalyst is less than a second threshold temperature, which is lower than the first threshold temperature (e.g., as described with respect to 204 of FIG. 2). The second threshold temperature may be a threshold amount lower than the light-off temperature, which may signify that the catalyst is especially cold, such as may occur during cold-weather conditions (e.g., during winter), which may further increase the amount of time it takes for the catalyst to reach its light-off temperature. For example, when the catalyst temperature is below the second threshold temperature, the time it takes for the catalyst to reach light-off temperature may result in degraded emissions and/or engine efficiency. Thus, if the temperature of the catalyst is below the second threshold temperature, more aggressive catalyst heating strategies, such as by combining multiple catalyst heating approaches, may be favored.

If the temperature of the catalyst is less than the second threshold temperature, method 300 proceeds to 306 and includes setting spark timing at the determined spark retard timing (e.g., as determined at 302), delivering fuel via split injection, and applying a magnetic field to one or more exhaust system components (such as a housing of the catalyst and/or an exhaust manifold proximate to the catalyst, each at least partially comprised of a magnetocaloric material). Delivering spark at the determined spark retard timing may increase exhaust temperature, but it may also decrease combustion stability, leading to an increased occurrence of misfire. Therefore, fuel may be delivered via split injection, with a first, larger portion of fuel delivered during an intake stroke to facilitate charge mixing and a second, remaining portion delivered via one or more injections during the compression stroke. The compression stroke injection(s) aid combustion stability by providing a rich pocket of air-fuel mixture at the vicinity of the spark plug. The magnetic field may be applied via a magnetic field generator positioned such that the magnetic field generated by the magnetic field generator reaches the one or more exhaust system components that are comprised of the magnetocaloric material. For example, if the magnetic field generator is a permanent magnet, applying the magnetic field to the one or more exhaust system components may include the controller actuating an actuator to move the permanent magnet into a position in which the magnetic field generated by the permanent magnet is applied to the one or more exhaust system components. If the magnetic field generator is an electromagnet, applying the magnetic field to the one or more exhaust system components may include the controller flowing electric current through the electromagnet, which may be proximate to, such as within a threshold distance from (e.g., in a range of 0-24 inches), the exhaust system component(s). In one example, the electromagnet is mounted around the exhaust component, such as a solenoid with the exhaust passage and/or the catalyst housing running through the hollow cylindrical interior of the electromagnet.

When the magnetic field is applied to the exhaust system component(s), the magnetic domains of the magnetocaloric material included in the exhaust system component(s) will align with the applied magnetic field, reducing the specific heat capacity of the magnetocaloric material and causing the temperature of the magnetocaloric material to increase as magnetic entropy is converted to thermal energy. Furthermore, as hot exhaust flows through the magnetocaloric material, the heat transferred from the exhaust to the magnetocaloric material will yield a greater increase in temperature due to the reduced specific heat capacity of the magnetocaloric material. Further still, the increased temperature of the exhaust due to operating at retarded spark timing will lead to more heat being transferred from the engine to the exhaust system components, leading to an even greater increase in the temperature of the magnetocaloric material than when the MCE is used alone (or when spark retard is used alone).

Additionally, when the magnetic field is applied, electromagnetic interference may affect sensor readings, such as output of an exhaust gas sensor (e.g., exhaust gas sensor 128 of FIG. 1). Thus, sensor readings may be compensated while the magnetic field is applied, such as by shifting the switching point of the exhaust gas sensor, as further described above with reference to FIG. 1.

If instead the temperature of the catalyst is not less than the threshold temperature at 304 (e.g., the temperature of the catalyst is less than the first threshold temperature, as described at 204 of FIG. 2, and greater than or equal to the second threshold temperature), method 300 proceeds to 308. At 308, method 300 includes determining an energy and fuel economy penalty of operating the engine at the determined spark retard timing, which may be referred to as a first penalty (penalty$_1$). For example, the controller may convert the fuel economy penalty into a unitless value based on a decreased engine torque ratio that corresponds to the determined retarded spark timing. That is, for the same amount of fuel delivered, less engine torque will be produced at the retarded spark timing versus operating at MBT spark timing. The controller may reference a look-up table or map to determine the decreased engine torque ratio that would be produced by the determined retarded spark timing, for example. There may not be an energy penalty of operating at the determined retarded spark timing (e.g., no additional energy is consumed). Therefore, the first penalty may be the fuel economy penalty for providing spark at the retarded timing that is converted to a unitless value for comparison with an energy penalty, as will be described below.

At 310, method 300 includes determining an energy and fuel economy penalty of generating and applying a magnetic field to exhaust system components, which may be referred to as a second penalty (penalty$_2$). For example, applying the magnetic field may use energy from a battery (e.g., traction battery 58 of FIG. 1) or vehicle power system, such as by supplying current to an electromagnet or moving a permanent magnet with an electronic actuator, resulting in an energy penalty. Further, in some examples, fuel economy may be reduced if energy that would have been used to power vehicle systems that increase fuel economy (e.g., such as by operating in an electric mode) is instead used to apply the magnetic field to the one or more exhaust system components. Thus, the controller may estimate an amount of energy that would be consumed by generating and applying the magnetic field to the exhaust system component(s). As an example, if the magnetic field generator is an electromagnet, the controller may estimate the amount of energy based on a temperature difference between the temperature of the catalyst and the first threshold temperature, exhaust temperature, and a strength of the magnetic field to be generated. The controller may input the temperature difference, the exhaust temperature, and the strength of the magnetic field to be generated into a look-up table or equation and output the estimated amount of energy, for example. As another example, if the magnetic field generator is a permanent magnet, the controller may estimate the amount of energy based on the energy supplied to an electronic actuator to move the permanent magnet from a starting position into a position in which the magnetic field generated by the permanent magnet is applied to the one or more exhaust system components and then back to the starting position. The energy supplied to the electronic actuator to move the permanent magnet may be a known, calibrated value stored in a memory of the controller, for example. The fuel economy penalty may be determined as the fuel economy penalty associated with not powering the vehicle systems that increase fuel economy, as applicable. The controller may convert both the fuel economy penalty and the energy penalties into unitless values, which are added together to determine the second penalty. As an example, the second penalty may be dominated by the energetic penalty of operating the engine while generating and applying the magnetic field to exhaust system component(s), such as when the fuel economy penalty is zero or near zero.

At 312, it is determined if the second penalty is less than the first penalty. That is, it is determined if the penalty of generating and applying the magnetic field to the exhaust system component(s) to change the specific heat capacity of the catalyst is less than the penalty of increasing the exhaust temperature via spark retard.

If the second penalty is less than the first penalty, method 300 proceeds to 314 and includes applying the magnetic field to the one or more exhaust system components while maintaining the spark timing for the requested engine torque at best fuel economy. For example, the spark timing may be maintained at or near MBT. In another example, spark timing may be adjusted nominally, responsive to other engine operating conditions (e.g., retarded responsive to an occurrence of knock), but will not be adjusted for the purpose of catalyst heating. As described above, applying the magnetic field to the one or more exhaust system components may include moving a permanent magnet (via an actuator) so that the magnetic field generated by the permanent magnet reaches the exhaust system component(s) or flowing electric current through an electromagnet.

If, at 312, the second penalty is not less than the first penalty, method 300 proceeds to 316 and includes setting the spark timing at the determined spark retard timing and delivering fuel via split injection, as described above at 306. The magnetic field will not be applied to the exhaust system component(s), and catalyst heating will be expedited via spark retard and not by using the magnetic field.

At 318, it is determined if the temperature of the catalyst is greater than or equal to the first threshold temperature. The catalyst reaching the first threshold temperature may signify the catalyst reaching its light-off temperature, for example. Thus, when the catalyst reaches the first threshold temperature, it may be sufficiently warm to efficiently treat exhaust gas and reduce vehicle emissions.

If the temperature of the catalyst is not greater than or equal to the first threshold temperature, method 300 proceeds to 320 and includes maintaining the expedited catalyst heating strategy. Maintaining the expedited catalyst heating strategy may optionally include maintaining the retarded spark timing and fuel delivery via split injection, as indicated at 322, and continuing to apply the magnetic field to exhaust system components, as indicated at 324. For example, if spark timing is retarded, fuel is delivered via split injection, and the magnetic field is applied for expediting catalyst heating (e.g., as at 306), all three parameters may be maintained. In another example, if the magnetic field is applied to expedite catalyst heating while spark timing and fuel delivery are not adjusted (e.g., as at 314), then the magnetic field may be maintained while spark timing and fuel delivery continue to be adjusted nominally. In a further example, if spark timing is retarded and fuel delivered via split injection for catalyst heating while the magnetic field is not applied (e.g., as at 316), then spark timing will continue to be retarded and fuel delivered via split injection while the magnetic field is not applied. In this way, expedited catalyst heating may be continued using an appropriate approach. Following 320, method 300 ends.

If the temperature of the catalyst is greater than or equal to the first threshold temperature, the catalyst may be operating at its optimal temperature, making strategies to expedite catalyst heating unnecessary. Thus, method 300 proceeds to 326 and includes stopping expedited catalyst heating. Stopping expedited catalyst heating may optionally include setting spark timing for the requested engine torque and best fuel economy, as indicated at 328, if retarded spark timing was used for expediting catalyst heating (e.g., as at 306 and 316). For example, spark may be provided at or near MBT in order to maximize engine power for the given engine load instead of at the retarded timing determined for expedited catalyst heating. Stopping expedited catalyst heating may optionally include deactivating the magnetic field at a controlled rate, as indicated at 330, if the MCE was used to decrease the specific heat capacity of the one or more exhaust system components (e.g., as at 306 and 314). Deactivating the magnetic field at the controlled rate may include decreasing the magnetic field from the fully applied field to no applied field over a duration that is not instantaneous, at a set rate (e.g., ramped rate or slope), so that the temperature of the catalyst is maintained at or above the first threshold temperature. For example, the controller may determine the rate using a look-up table, with the strength of the applied magnetic field, the exhaust temperature, and the mass of the catalyst as the inputs and output the rate. The controller may then decrease the strength of the magnetic field according to the determined rate so that no magnetic field is applied by the end of the duration. Further, if additional sensors are included, such as a catalyst temperature sensor and/or an exhaust gas sensor coupled downstream of the catalyst, output of the additional sensor(s) may be used as feedback for adjusting the duration and the controlled rate. For example, if the downstream exhaust gas sensor indicates low catalyst efficiency, such as by measuring high concentrations of hydrocarbons and/or NOx, the determined rate may be decreased (and the duration increased) so that the magnetic field remains applied to the one or more exhaust system components for a longer duration. As another example, if the catalyst temperature sensor indicates that the catalyst temperature is a threshold amount above the first threshold temperature, the determined rate may be increased (and the duration decreased) so that the strength of the magnetic field applied to the one or more exhaust system components is decreased more quickly.

As one example, if the magnetic field generator is a permanent magnet, the controller may generate a control signal that is sent to an actuator of the permanent magnet to gradually move the permanent magnet away from the exhaust system component(s) at a rate that corresponds to the magnetic field applied to the exhaust system component(s) decreasing at the desired rate. As another example, if the magnetic field generator is an electromagnet, the controller may decrease the amount of electric current flowing to the electromagnet at a rate that corresponds to the magnetic field applied to the exhaust system component(s) decreasing at the desired rate. As the magnetic field is decreased, the magnetic domains of the magnetocaloric material of the exhaust system component(s) become disoriented from the external magnetic field due to the thermal energy present in the exhaust system component(s), which increases the ability of the exhaust system component(s) to store thermal energy (e.g., the specific heat capacity is increased, and more heat transfer is required for a change in temperature). If the exhaust system component(s) were thermally isolated, the temperature may decrease; however, due to the flow of hot exhaust through the exhaust system and the controlled rate of magnetic field deactivation, the temperature of the exhaust system component(s) may be maintained. Following 326, method 300 ends.

Thus, in one example, method 300 may include determining a temperature of a catalyst as well as a spark retard timing for increased catalyst heating. The method may further include determining a first penalty, which is an energy and fuel economy penalty of operating at the determined spark retard timing, and a second penalty, which is an energy and fuel economy penalty of generating and applying a magnetic field to one or more exhaust system components that are proximate to the catalyst and at least partially composed of a magnetocaloric material. In response to a first condition, in which the second penalty is less than the first penalty and the temperature of the catalyst is less than a first threshold temperature and greater than a second threshold temperature, a magnetic field is applied (e.g., via a magnetic field generator) to the one or more exhaust system components while spark is provided at or near MBT timing. In response to a second condition, in which the second penalty is greater than or equal to the first penalty and the temperature of the catalyst is less than the first threshold temperature and greater than the second threshold temperature, spark timing is retarded from MBT timing, fuel is delivered via split injection, and the magnetic field is not applied to the one or more exhaust system components. In response to a third condition, in which the temperature of the catalyst is less than the second threshold temperature and regardless of the first and second penalties, the magnetic field is applied to the one or more exhaust system components, spark timing is retarded from MBT timing, and fuel is delivered via split injection. In response to none of the first, second, or third conditions being present, such as when the temperature of the catalyst is greater than or equal to the first threshold temperature, spark is provided at or near MBT timing and the magnetic field is not applied to the one or more exhaust system components. In some examples, applying the magnetic field to the one or more exhaust system components occurs when the first or third condition is present and not while the second condition is present. Further, operating with retarded spark timing and fuel delivered via split injection occurs when the second or third condition is present and not while the first condition is present. Further still, operating with spark timing at or near MBT timing occurs when the second and third conditions are not present and/or while or during the first condition.

Further, instructions stored in memory may include estimating the catalyst temperature from output of an exhaust temperature sensor (e.g., exhaust temperature sensor 158 of FIG. 1). The catalyst temperature may then be used to determine whether the third condition is present. Additionally, the catalyst temperature along with the first penalty and the second penalty may be used to determine whether the first condition or the second condition is present. In response to the first or the third condition being present, application of the magnetic field may be performed by instructions for sending a signal to actuate the magnetic field generator and spark timing may be set at or near MBT timing by instructions for sending a signal SA to an ignition system (e.g., ignition system 190 of FIG. 1) at or near MBT timing. In response to the second or third condition being present, spark may be provided at the retarded spark timing by instructions for sending a signal SA to an ignition system (e.g., ignition system 190 of FIG. 1) at the retarded spark timing and fuel may be delivered via split injection by instructions for sending a signal FPW to a fuel injector (e.g., fuel injector 166 of FIG. 1) at appropriate positions of an engine cycle. In some examples, the method may include determining whether to perform one or more of each of the application of the magnetic field to the one or more exhaust system components, providing spark at the retarded spark timing, and delivering fuel via split injection based on a determination of whether the first condition is present, a determination of whether the second condition is present, and a determination of whether the third condition is present.

FIG. 4 shows an example graph 400 of using an applied magnetic field to thermally regulate components of a vehicle system during vehicle operation. A temperature of a catalyst (e.g., catalyst 178 of FIG. 1) is shown in plot 402, spark timing is shown in plot 404, a state of charge of a system battery (e.g., traction battery 58 of FIG. 1) is shown in plot 406, a temperature of a braking system (e.g., braking system 59 of FIG. 1) is shown in plot 408, an amount of braking effort is shown in plot 410, application of a magnetic field to exhaust system components is shown in plot 412 (solid line), and application of a magnetic field to braking system components is shown in plot 414 (dashed line). Additionally, a first threshold temperature of the catalyst is indicated at T1, a second threshold temperature of the catalyst is indicated at T2, a threshold temperature of the braking system is indicated at T3, and a threshold SOC for switching from an electric mode of operation (in which torque from an electric motor, such as electric machine 52 of FIG. 1, is solely used to propel the vehicle) to an engine mode of operation (in which torque from an engine, such as engine 10 of FIG. 1, is used to propel the vehicle) is indicated by dashed line 416. MBT spark timing is also shown. In the example of FIG. 4, MBT spark timing is illustrated as a straight line. However, it should be understood that MBT spark timing varies based on engine operating conditions, as described with reference to FIG. 1. For all of the above, the X-axis represents time, with time increasing along the X-axis from left to right. The Y-axis indicates each labeled parameter, with values increasing from bottom to top, except for plot 404, in which spark timing is advanced or retarded relative to MBT.

Just prior to time t1, the engine is started. Initially, the engine is operated with spark timing near MBT. Responsive to the temperature of the catalyst (plot 402) being less than the second threshold temperature T2, at time t1, spark timing is retarded from MBT (plot 404) to increase exhaust temperature and a magnetic field is applied to one or more exhaust system components (plot 412) at least partially comprised of a magnetocaloric material, such as a housing of the catalyst, to reduce the specific heat capacity of the exhaust system component(s). The magnetic field may be applied by a magnetic field generator located near the exhaust system component(s), such as magnetic field generator 62 of FIG. 1. As a result of magnetic entropy being converted to thermal energy as the magnetic fields of the magnetocaloric material are aligned by the external magnetic field, the temperature of the catalyst increases quickly at first (plot 402). Then, the temperature of the catalyst continues to increase steadily as the heat from the hot exhaust is transferred to the catalyst, with the rate of heat transfer decreasing as the temperature of the catalyst approaches the exhaust temperature. Due to the reduced specific heat capacity of the exhaust system component(s) and the increased exhaust temperature, the temperature of the catalyst (plot 402) rises more quickly than if the magnetic field were applied without using spark retard (dashed segment 402*b*) and if spark retard were used without the MCE (dotted segment 402*c*). By combining both strategies, the catalyst reaches the first threshold temperature T1, which may be a light-off temperature of the catalyst, at time t2. Applying the magnetic field has an energetic penalty, decreasing the battery SOC (plot 406). However, as the vehicle is driven, the battery may be recharged.

Responsive to the catalyst reaching the first threshold temperature T1 (which may be the catalyst light-off temperature) at time t2, the magnetic field applied to the exhaust system component(s) is decreased at a gradual and controlled rate (e.g., from "on," referring to full strength, to "off," referring to no applied magnetic field). In this way, the temperature of the catalyst may be maintained above the first threshold temperature T1 as the magnetic domains of the magnetocaloric material of the exhaust system component(s) become disoriented by converting thermal energy to magnetic entropy. Additionally at time t2, responsive to the catalyst reaching its light-off temperature, spark timing is returned to MBT (plot 404).

At time t3, a vehicle braking event occurs, as indicated by an increase in the amount of braking effort (plot 410). Due to heat generated by friction as the brakes are engaged responsive to the amount of braking effort, the temperature of the braking system increases (plot 408). Upon completion of the vehicle braking event (e.g., no braking effort is requested) at time t4, a magnetic field is applied to one or more braking system components (plot 414) at least partially comprised of a magnetocaloric material, such as brake rotors, to reduce the specific heat capacity of the braking system component(s). The magnetic field may be applied by a magnetic field generator located near the braking system component(s), such as magnetic field generator 60 of FIG. 1. As a result of magnetic entropy being converted to thermal energy as the magnetic fields of the magnetocaloric material are aligned by the external magnetic field, the temperature of the braking system initially increases (plot 408). However, due to the larger temperature difference between the braking system and the ambient surroundings, heat is dissipated from the braking system at a faster rate than when the magnetic field is not applied to the braking system component(s) (dashed segment 408*b*), with the rate of heat transfer decreasing as the temperature of the braking system becomes closer to the temperature of the ambient surroundings. Additionally, due to the reduced specific heat capacity of the magnetocaloric material, the temperature of the braking system (plot 408) decreases more rapidly than when the MCE is not used (dashed segment 408*b*).

At time t5, a second vehicle braking event occurs (plot 410). Responsive to the braking request, the magnetic field applied to the braking system component(s) is deactivated (plot 414). As a result of the magnetic domains of the magnetocaloric material of the braking system component(s) converting thermal energy to magnetic entropy as they become disoriented, the temperature of the braking system temporarily decreases, but then increases due to the heat produced through braking (plot 408). However, if the MCE had not been used, the braking system would have started at a higher temperature, leading to a higher maximum temperature achieved during the braking event (dashed segment 408*b*). Note that in other examples, the temperature of the braking system may not decrease when the magnetic field applied to the braking system component(s) is deactivated due to the heat generated through braking and a speed at which the magnetocaloric material reacts to the magnetic field change; instead, the braking system temperature may initially increase to a smaller degree than if the magnetic field had not been applied prior to the braking event.

Upon completion of the second vehicle braking event at time t6, the magnetic field is again applied to the braking system component(s) (plot 414), leading to a similar initial increase in temperature followed by a steady decrease in temperature (plot 408). At time t7, the braking system reaches threshold temperature T3, indicating that the braking system is sufficiently cool. Responsive to the braking system reaching threshold temperature T3, the magnetic field applied to the braking system component(s) is switched off (plot 414). The temperature of the braking system further decreases (plot 408) as the magnetic fields become disoriented. If the MCE had not been used to enhance braking system cooling, it would take the braking system longer to reach threshold temperature T3 (dashed segment 408b). However, each time the magnetic field is applied, the battery SOC may decrease (plot 406).

At time t8, the engine is switched off as the vehicle is transitioned to an electric mode of operation. For example, the electric mode of operation may be selected to conserve fuel (e.g., the amount of fuel in a fuel system of the vehicle is less than a threshold amount). In the electric mode of operation, combustion does not occur, and thus, spark is disabled (plot 404). Without hot exhaust warming the catalyst, the temperature of the catalyst decreases (plot 402) and drops below first threshold temperature T1. However, with the catalyst not in use, the controller may choose not to maintain the catalyst above its light-off temperature (and thus no magnetic field is applied to the catalyst event though the catalyst temperature falls below the first threshold temperature T1).

As the vehicle is operated in the electric mode of operation, the battery SOC decreases (plot 406). Responsive to the battery state of charge reaching the threshold battery SOC (dashed line 416) at time t9, the engine is restarted. Since the temperature of the catalyst is less than the first threshold temperature T1, the controller determines a catalyst heating strategy by comparing a penalty (e.g., fuel economy/energy penalty) of using the magnetic field to a penalty (e.g., fuel economy/energy penalty) of using spark retard to heat the catalyst, as described above with reference to FIG. 3. In response to the fuel economy/energy penalty of generating and operating the magnetic field being less than the fuel economy/energy penalty of retarding spark, the magnetic field is selected for expediting catalyst heating, and so the magnetic field is applied to the exhaust system component(s) (plot 412) while spark timing is set near MBT (plot 404). The temperature of the catalyst quickly increases (plot 402). Responsive to the temperature of the catalyst reaching the first threshold temperature T1 at time t10, the magnetic field applied to the exhaust system component(s) is decreased at a controlled rate (plot 412), which in the example of FIG. 4, is the same rate as between time t2 and t3. However, in other examples, the rate may not be the same between multiple catalyst heating events, with the rate determined based on the strength of the applied magnetic field, the exhaust temperature, and a mass of the catalyst, as described above with reference to FIG. 3, for example. Thus, the catalyst is kept above its light-off temperature as the engine is operated.

In this way, by including a magnetocaloric material in one or more exhaust system components (e.g., a housing of an exhaust catalyst) and one or more braking system components (e.g., brake rotors) as well as a magnetic field generator in a vehicle, application of a magnetic field may be used to thermally regulate the exhaust catalyst and the braking system. The application of the magnetic field can be used for both heating and cooling depending on the direction of heat transfer. In the case of the exhaust catalyst, heat is transferred from the exhaust to the catalyst. In the case of the braking system, heat is transferred out of the braking system to ambient air. When magnetic domains of the magnetocaloric material included in the one or more exhaust system components are aligned by the magnetic field applied by the magnetic field generator, the temperature of the catalyst increases more rapidly, reducing an amount of time before the catalyst reaches its light-off temperature, reducing vehicle emissions. The application of the magnetic field to the exhaust system component(s) may be used alone or in combination with other catalyst heating strategies, such as spark retard. If the magnetic field is applied to the magnetocaloric material of the exhaust system component(s) instead of spark retard, engine torque and fuel efficiency may be increased. When magnetic domains or the magnetocaloric material included in the one or more braking system components are aligned by a magnetic field applied by the magnetic field generator, the temperature of the braking system decreases more rapidly and reaches a cooler temperature than may be achieved without applying the magnetic field, preventing braking system degradation due to high temperatures. By applying the magnetic field to the magnetocaloric material of the braking system component(s) for increased heat dissipation instead of, for example, increasing brake rotor size, vehicle mass may be reduced.

The technical effect of applying a magnetic field to an exhaust catalytic converter that is at least partially comprised of a magnetocaloric material is that a temperature of the exhaust catalytic converter increases at a faster rate.

As one example, a method for an engine is provided, comprising: responsive to a temperature of an exhaust catalytic converter being below a first threshold temperature, applying a magnetic field to an exhaust system component arranged proximate to the exhaust catalytic converter; and responsive to the temperature increasing to or above the first threshold temperature, stopping applying the magnetic field. In the preceding example, additionally or optionally, applying the magnetic field to the exhaust system component is further responsive to a fuel economy and energy penalty of generating and applying the magnetic field being less than a fuel economy and energy penalty of adjusting an alternate engine operating parameter to increase the temperature of the exhaust catalytic converter to the first threshold temperature. In any or all of the preceding examples, additionally or optionally, adjusting the alternate engine operating parameter includes retarding spark timing of spark plugs of one or more engine cylinders. In any or all of the preceding examples, the method additionally or optionally further comprises delivering fuel to one or more engine cylinders via split injection while retarding the spark timing. In any or all of the preceding examples, the method additionally or optionally further comprises adjusting the alternate engine operating parameter to increase the temperature of the exhaust catalytic converter to the first threshold temperature instead of applying the magnetic field to the exhaust system component in response to the temperature being below the first threshold temperature and the fuel economy and energy penalty of generating and applying the magnetic field being greater than the fuel economy and energy penalty of adjusting the alternate engine operating parameter to increase the temperature of the exhaust catalytic converter to the first threshold temperature. In any or all of the preceding examples, the method additionally or optionally further comprises retarding spark at one or more engine cylinders and performing split fuel injection at the one or more engine cylinders, while applying the magnetic field to the exhaust system component, in response to the temperature being below a second threshold temperature that is lower than the first threshold temperature. In any or all of the preceding examples, additionally or optionally, the first threshold temperature is a light-off temperature of the exhaust catalytic converter and the applying the magnetic field is performed during an engine cold start. In any or all of the preceding examples, additionally or optionally, stopping applying the magnetic field includes decreasing the magnetic field at a controlled rate, where the controlled rate is based on a rate that maintains the temperature of the exhaust catalytic converter at or above the first threshold temperature. In any or all of the preceding examples, additionally or optionally, the exhaust system component is composed at least partially of a magnetocaloric material. In any or all of the preceding examples, additionally or optionally, the exhaust system component includes a housing of the exhaust catalytic converter. In any or all of the preceding examples, additionally or optionally, the exhaust system component is an exhaust passage in which the exhaust catalytic converter is positioned. In any or all of the preceding examples, the method additionally or optionally further comprises applying the magnetic field to a braking system component of a vehicle in which the engine is installed for a duration following a vehicle braking event; and stopping applying the magnetic field to the braking system component in response to one or more of a temperature of the braking system component reaching a third threshold temperature, reaching a calculated threshold duration of applying the magnetic field, and commencement of a subsequent braking event.

As another example, a method for an engine comprises: in response to a temperature of a catalyst of an exhaust system of the engine being below a first threshold temperature, heating the catalyst to the first threshold temperature by: during a first condition, applying a magnetic field to an exhaust system component of the exhaust system arranged proximate to the catalyst while maintaining spark timing of the engine at maximum break torque (MBT); and during a second condition, retarding spark timing from MBT while not applying the magnetic field to the exhaust system component. In the preceding example, additionally or alternatively, the first condition includes an energy and fuel economy penalty of generating and applying the magnetic field being less than an energy and fuel economy penalty of retarding spark timing to heat the catalyst to the first threshold temperature. In any or all of the preceding examples, additionally or optionally, the second condition includes the energy and fuel economy penalty of generating and applying the magnetic field being greater than or equal to the energy and fuel economy penalty of retarding spark timing to heat the catalyst to the first threshold temperature. In any or all of the preceding examples, the method additionally or optionally further comprises, during a third condition when the temperature of the catalyst is below a second threshold temperature that is lower than the first threshold temperature, heating the catalyst to the first threshold temperature by retarding the spark timing from MBT and applying the magnetic field to the exhaust system component.

As a further example, a system for a vehicle is provided, comprising: an exhaust passage of an engine, the exhaust passage including a catalyst; a magnetic field generator; and a controller with computer readable instructions stored in memory for: during a cold start of the engine, in response to a temperature of the catalyst being below a light off temperature, activating the magnetic field generator to generate a magnetic field in an area of the catalyst. In the preceding example, additionally or optionally, one or more of the catalyst and a housing of the catalyst comprises a magnetocaloric material. In any or all of the preceding examples, the system additionally or optionally further comprises a spark plug, and wherein the computer readable instructions further include instructions for retarding spark timing of the spark plug during the cold start and while activating the magnetic field generator to generate the magnetic field in response to the temperature of the catalyst being a threshold amount below the light off temperature. In any or all of the preceding examples, the system additionally or optionally further comprises a brake rotor and a brake pad of a braking system of the vehicle, and wherein the computer readable instructions further include instructions for activating the magnetic field generator to generate a magnetic field in an area of one or more of the brake pad and the brake rotor following a braking event and until a temperature of the one or more of the brake pad and the brake rotor decreases to a lower threshold temperature or a start of a subsequent braking event.

In another representation, a method comprises, following a vehicle braking event, applying a magnetic field to a braking system component for a duration and then stopping application of the magnetic field after the duration. In a first example, the duration is based on a temperature of the braking system component reaching a threshold temperature. In a second example, the duration is based on a subsequent braking event occurring, wherein the application of the magnetic field is stopped when the subsequent braking event starts. In a third example, the duration is based on prior braking event durations and timings. In any or all of the preceding examples, the braking system component may be brake rotors at least partially comprised of a magnetocaloric material. In any or all of the preceding examples, additionally or alternatively, the braking system component may be brake pads at least partially comprised of the magnetocaloric material.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, V-8, V-10, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   responsive to a temperature of an exhaust catalytic converter being below a first threshold temperature, applying a magnetic field to an exhaust system component arranged proximate to the exhaust catalytic converter;
   responsive to the temperature increasing to or above the first threshold temperature, stopping applying the magnetic field; and
   wherein applying the magnetic field to the exhaust system component is further responsive to a fuel economy and energy penalty of generating and applying the magnetic field being less than a fuel economy and energy penalty of adjusting an alternate engine operating parameter to increase the temperature of the exhaust catalytic converter to the first threshold temperature.

2. The method of claim 1, wherein adjusting the alternate engine operating parameter includes retarding spark timing of spark plugs of one or more engine cylinders.

3. The method of claim 2, further comprising delivering fuel to one or more engine cylinders via split injection while retarding the spark timing.

4. The method of claim 1, further comprising adjusting the alternate engine operating parameter to increase the temperature of the exhaust catalytic converter to the first threshold temperature instead of applying the magnetic field to the exhaust system component in response to the temperature being below the first threshold temperature and the fuel economy and energy penalty of generating and applying the magnetic field being greater than the fuel economy and energy penalty of adjusting the alternate engine operating parameter to increase the temperature of the exhaust catalytic converter to the first threshold temperature.

5. The method of claim 1, further comprising retarding spark at one or more engine cylinders and performing split fuel injection at the one or more engine cylinders, while applying the magnetic field to the exhaust system component, in response to the temperature being below a second threshold temperature that is lower than the first threshold temperature.

6. The method of claim 1, wherein the first threshold temperature is a light-off temperature of the exhaust catalytic converter and the applying the magnetic field is performed during an engine cold start.

7. The method of claim 1, wherein a stopping of applying the magnetic field includes decreasing the magnetic field at a controlled rate, where the controlled rate is based on a rate that maintains the temperature of the exhaust catalytic converter at or above the first threshold temperature.

8. The method of claim 1, wherein the exhaust system component is composed at least partially of a magnetocaloric material.

9. The method of claim 1, wherein the exhaust system component includes a housing of the exhaust catalytic converter.

10. The method of claim 1, wherein the exhaust system component is an exhaust passage in which the exhaust catalytic converter is positioned.

11. The method of claim 1, further comprising:
    applying the magnetic field to a braking system component of a vehicle in which the engine is installed for a duration following a vehicle braking event; and
    stopping applying the magnetic field to the braking system component in response to one or more of a temperature of the braking system component reaching a third threshold temperature, reaching a calculated threshold duration of applying the magnetic field, and commencement of a subsequent braking event.

12. A method for an engine, comprising:
    in response to a temperature of a catalyst of an exhaust system of the engine being below a first threshold temperature, heating the catalyst to the first threshold temperature by:
      during a first condition, applying a magnetic field to an exhaust system component of the exhaust system arranged proximate to the catalyst while maintaining spark timing of the engine at maximum break torque (MBT); and
      during a second condition, retarding spark timing from MBT while not applying the magnetic field to the exhaust system component.

13. The method of claim 12, wherein the first condition includes an energy and fuel economy penalty of generating and applying the magnetic field being less than an energy and fuel economy penalty of retarding spark timing to heat the catalyst to the first threshold temperature.

14. The method of claim 13, wherein the second condition includes the energy and fuel economy penalty of generating and applying the magnetic field being greater than or equal to the energy and fuel economy penalty of retarding spark timing to heat the catalyst to the first threshold temperature.

15. The method of claim 12, further comprising, during a third condition when the temperature of the catalyst is below a second threshold temperature that is lower than the first threshold temperature, heating the catalyst to the first threshold temperature by retarding the spark timing from MBT and applying the magnetic field to the exhaust system component.

16. A system for a vehicle, comprising:
    an exhaust passage of an engine, the exhaust passage including a catalyst;
    a magnetic field generator; and
    a controller with computer readable instructions stored in memory for:
    during a cold start of the engine, in response to a temperature of the catalyst being below a light off temperature, activating the magnetic field generator to generate a magnetic field in an area of the catalyst; and
    wherein activating the magnetic field generator to generate a magnetic field in an area of the catalyst is further responsive to a fuel economy and energy penalty of generating and applying the magnetic field being less than a fuel economy and enemy penalty of adjusting an alternate engine operating parameter to increase the temperature of the catalyst to the light off temperature.

17. The system of claim 16, wherein one or more of the catalyst and a housing of the catalyst comprises a magnetocaloric material.

18. The system of claim 16, further comprising a spark plug, and wherein the computer readable instructions further include instructions for retarding spark timing of the spark plug during the cold start and while activating the magnetic field generator to generate the magnetic field in response to the temperature of the catalyst being a threshold amount below the light off temperature.

19. The system of claim 16, further comprising a break pad and a brake rotor of a braking system of the vehicle, and wherein the computer readable instructions further include instructions for activating the magnetic field generator to generate a magnetic field in an area of one or more of the brake pad and the brake rotor following a braking event and until a temperature of the one or more of the brake pad and the brake rotor decreases to a lower threshold temperature or a start of a subsequent braking event.

* * * * *